Jan. 7, 1930.   J. A. ROBINSON   1,742,729
ANTISKID DEVICE
Filed Feb. 9, 1928
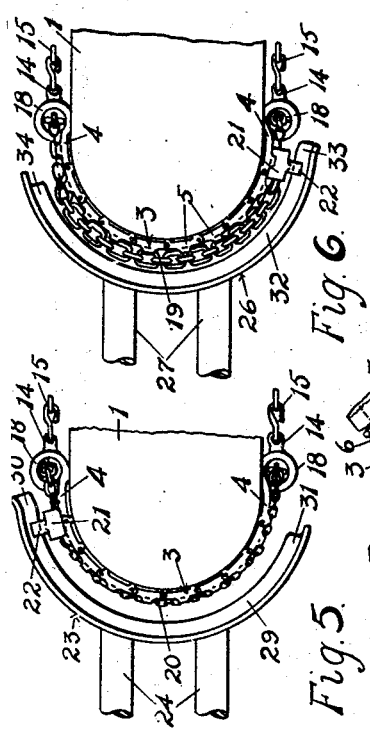
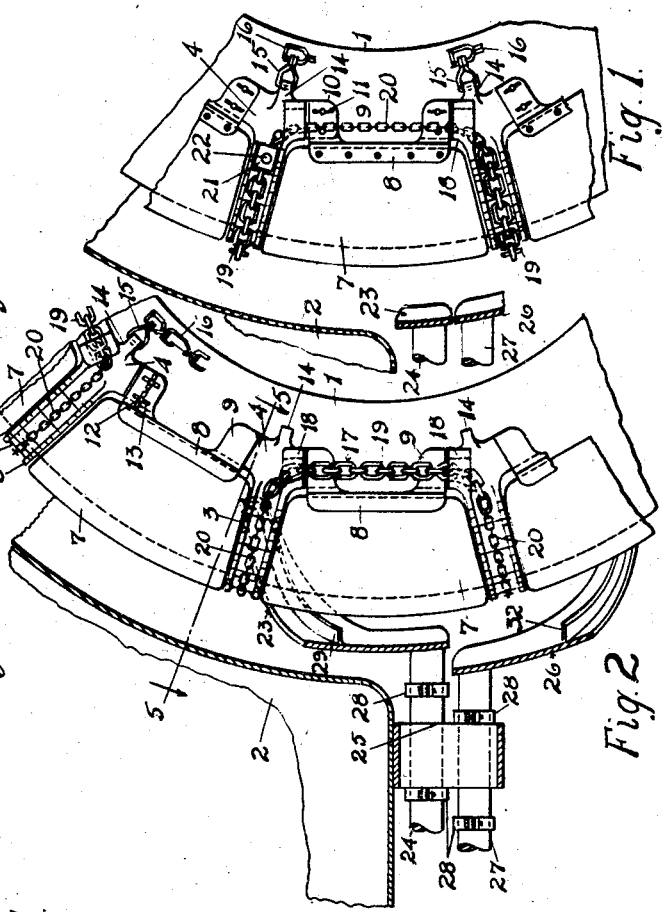
Inventor
Jay A. Robinson
By Barnett & Truman
Attys.

Patented Jan. 7, 1930

1,742,729

UNITED STATES PATENT OFFICE

JAY A. ROBINSON, OF CHICAGO, ILLINOIS, ASSIGNOR OF ONE-HALF TO JOHN A. WARE, OF CHICAGO, ILLINOIS

ANTISKID DEVICE

Application filed February 9, 1928. Serial No. 253,052.

This invention relates to an anti-skid device particularly adapted for use on automobile wheels. More specifically, the invention relates to an anti-skid device that is permanently positioned upon the wheel, and is movable from an operative to an inoperative position while the wheel is in motion.

According to the form of the invention shown and described in this application by way of example, a casing or tread covering is secured in substantially permanent position about the tread of the automobile tire. This casing consists of a plurality of traction blocks, between which are spaced transverse guide grooves. A plurality of endless chains or other flexible anti-skid members are carried by the casing so that each anti-skid member is looped through a pair of adjacent transverse grooves, and along the sides of the periphery of the wheel so as to connect these grooves. The anti-skid device consists of alternate high and low sections, or sections of relatively smaller and greater transverse cross-section and the member is shiftable through the guides so as to bring either the high portions or the low portions alternatively into position in the transverse guide grooves. When the high portions are located in the grooves, they project beyond the tread surface of the traction blocks so as to serve as anti-skid devices. When the low sections of the shiftable members are in the grooves, they do not project above the tread surface of the traction blocks, and the anti-skid devices are now inoperative. Non-rotating cam means, mounted on the automobile body, are shiftable toward or from the tread of the wheel so as to engage portions of the anti-skid devices and successively shift these devices from operative to inoperative position, or vice versa, as the wheel rotates.

The principal object of this invention is to provide a new and improved anti-skid device of the type briefly described hereinabove and disclosed more in detail in the description which follows.

Another object is to provide an anti-skid device that may be attached permanently in position upon the wheel or tire, and moved from inoperative to operative position, or vice versa, while the automobile is in motion, without the driver leaving his seat.

Another object is to provide a combined traction and anti-skid device that may be permanently attached as a covering for the tread of a wheel.

Other objects and advantages of this invention will be more apparent from the following detailed description of one approved form of apparatus involving the principles of this invention.

In the accompanying drawings:

Fig. 1 shows a portion of the improved anti-skid device, mounted on one of the automobile wheels, and moved into operative position.

Fig. 2 is a similar view showing the anti-skid device in the inoperative position which it assumes when the car is running under normal conditions. However, the devices are about to be shifted to the operative position shown in Fig. 1.

Fig. 3 is a plan view showing one of the anti-skid units in position on the wheel.

Fig. 4 is a plan view of the shifting cams.

Fig. 5 is a transverse cross section, taken substantially on the line 5—5 of Fig. 2.

Fig. 6 is a view similar to Fig. 5, but showing the anti-skid device in its operative position, and about to be shifted to inoperative position.

Referring to the drawings, 1 indicates a portion of one of the rear wheels of the automobile, or more particularly the tire which is mounted on this wheel. A portion of the automobile body is indicated at 2. When the car is running forwardly, the wheel 1 rotates in the direction of the arrows. The anti-skid assembly is adapted to be secured permanently about the periphery or tread of the tire or wheel 1. By "permanently" we mean that the device is left in place on the wheel under all running conditions. It may, however, be removed for the purpose of changing tiles, or for transferring the device from one wheel to another.

The combined traction and anti-skid assembly which is mounted as a tread-covering about the tire comprises a metallic frame consisting of a plurality of metal members linked together, and serving as a support and guiding means for the traction blocks and the anti-skid members. Each of the guide members 3 extends in arcuate form about the periphery of tire 1, and consists of a pair of end plates 4 positioned at the two sides of the tire, and a plurality of links 5 which are grooved on their upper surfaces, as at 6, and are linked pivotally together so that the guide member 3 may give or change its shape to accord with the changing conformity of the tire. The traction blocks 7, which are formed of hard rubber, or other suitable tread material, are adapted to be mounted between the guide members 3. The traction blocks 7 are sufficiently thick to normally project beyond the outer surface of the guide members 3 and assume all of the running traction of the wheel. Metallic reinforcing plates 8, secured at the respective side edges of the blocks 7, are formed with end ears 9, which overlie and are suitably secured to ears 10 on the plates 4 so as to link the assembly together about the periphery of the tire. Any suitable semi-permanent attaching means, such as the fasteners 11 may be utilized to connect the ears 9 and 10, and at one location, turn-buttons 12 on ears 10 adapted to be passed through slots 13 in ears 9 may be utilized to form a more readily detachable connection between the ends of the assembly. Other ears 14, projecting radially inward from the plates 4, are connected by links 15 with the chains 16 which are adapted to extend around beneath the inner side peripheries of the tire 1 and thus hold the assemblies firmly in position on the tire.

The anti-skid devices 17 are in the form of endless chains or cables, preferably of metal. The cross-sectional structure of these devices may be varied from the example here shown, it being essential that the devices have sufficient flexibility to bend through the guide members, as hereinafter described, have a sufficiently rough outer surface to give the desired anti-skid grip on the road, and be sufficiently hard and durable to resist wear for a reasonable length of time. Each of these members 17 is of sufficient length to be looped through two of the adjacent guide grooves 6, and extend from one of these grooves to the next, along the sides of the tire. The members 17 are guided through loops or guide members 18 formed on the plates 4 at the ends of the grooves 6. Each member 17 consists of two portions or lengths 19 which are relatively high, or of relatively large cross-sectional area, and two portions 20 which are relatively low or of relatively small cross-sectional area. The portions 19 and 20 are alternately arranged, and are each of substantially the same length, that is, substantially the same as the arcuate length of one of the guide members 3, or the distance between two of the spaced apart guide members.

In other words, when the larger sections 19 occupy the guide grooves 6 (as shown in Fig. 1), the smaller sections 20 will be positioned at the sides of the tire. Conversely, when the low sections 20 are in the guide grooves, the larger sections 19 will be positioned at the sides of the tire, as shown in Fig. 2. The sections 19 are of sufficient size to project beyond the tread surface of the traction blocks 7 and grip the road-way, thus serving as anti-skid devices. However, when the low sections 20 are in the grooves 6, (as in Fig. 2), they do not project into engagement with the roadway, and the anti-skid devices are inoperative.

In each of the anti-skid members 17, at the juncture between one of the high sections 20 and one of the low sections 19, is positioned a link 21 provided with an outstanding pin or stud 22, of sufficient height to project considerably beyond the surface of the traction blocks 7. A non-rotating shifting member or cam 23 is mounted at the ends of a pair of rods 24 guided in supporting bracket 25, which is secured to a portion of the car body 2. The shifter 23 is adapted to move the anti-skid devices 17 from inoperative to operative positions. A similar shifting device 26, adapted to move the members 17 from their operative to their inoperative positions, is mounted on rods 27, also guided in bracket 25. The rods 24 and 27 are movable by any suitable connections extending to a location adjacent the driver's seat, so as to move the members 23 or 26 substantially radially of wheel 1 toward or from the tread of the wheel. Suitable stops 28 are positioned on the rods 24 and 27 to limit movement of the cams 23 and 26 toward or from the wheel.

Under normal running conditions, both members 23 and 26 are withdrawn away from the wheel, as indicated in Fig. 1. Assuming that the anti-skid devices are in normal inoperative position, as indicated in Fig. 2, and that it is desired to move these members into the operative position shown in Fig. 1, the member 23 is moved toward the wheel to the position shown in Figs. 2 and 5. It will be noted that a cam rib 29, which extends diagonally of the tread of the wheel, is formed on the surface of member 23 adjacent the wheel, and when member 23 is moved to the position shown in Figs. 2 and 5, one end 30 of rib 29 will encounter the stud 22 on the anti-skid device 17 as the wheel rotates in the direction of the arrow. The continued rotation of the wheel will cause the stud 22 to be shifted across the face of the diagonal rib 29 until it passes off from the end 31 thereof, this movement of stud 22 pulling the member 17 through the guide grooves 6 and loops 18 so as to shift the larger portions 19 of the member into position in grooves 6, as shown in Fig. 1. Each successive anti-skid member 17 will be shifted in this manner until the wheel 1 has made a complete rotation and all of the devices have been shifted to operative position. It will be noted that the exit ends 31 of the cams 29 do not extend inwardly of the wheel as far as the entrance ends 30, so that when all of the studs 22 have been shifted to the position indicated in Fig. 1, they will not encounter the cam 29, but will pass freely by the end 31 thereof. After all of the anti-skid devices have been shifted to operative position, the member 23 may be withdrawn to its normal inoperative position, as shown in Fig. 1.

In an exactly similar manner, the member 26 is moved inwardly to engage the studs 22 and return the anti-skid devices 17 to inoperative positions. It will be noted that the cam rib 32 on member 26 inclines in the opposite direction to the rib 29 of member 23, and that the entrance end 33 of rib 32 extends inwardly of wheel 1 further than the exit end 31 of rib 29 so that the studs 22 will be engaged when in the position shown in Figs. 1 and 6.

It is believed that the operation of this device will be apparent from the preceding description. The assembly is secured in position about the wheel or tire 1 and left permanently thereon unless the tire is to be changed, or the assembly is to be transferred to another wheel. In normal operation, the running traction is entirely assumed by the blocks 7 and there is no appreciable wear on either the anti-skid devices 17 or the tire 1. If a storm, or a slippery stretch of roadway is encountered while traveling, the driver need not stop nor get out of the car, but by suitably manipulating the shifting rods 24, he may bring the anti-skid devices 17 into operative position, and when the abnormal conditions have ceased, the anti-skid devices may be returned to inoperative position by suitably manipulating the rods 27.

The traction blocks 7 may be removed and replaced when worn, and the same is true of the anti-skid devices 17. There is no appreciable wear on the remainder of the device, which should normally last for an indefinite time.

The traction blocks 7 might be formed integrally with the tire 1, and the remainder of the mechanism positioned about the tire and within the grooves between these tire blocks. It is to be understood that numerous other changes may be made in the design and proportions of the parts here shown by way of example, without departing from the scope of this invention as set forth in the claims which follow.

I claim:—

1. An anti-skid device adapted to be mounted on a wheel, said device comprising an endless flexible member having alternate high and low portions, and means for shifting the member to bring either the high or low portions into position on the tread of the wheel.

2. An anti-skid device comprising an endless flexible member adapted to be mounted partly on the tread of a wheel and partly at the sides of a wheel, said member consisting of alternate high and low portions, and means for shifting the member to bring either the high or low portions into position on the tread of the wheel.

3. An anti-skid device comprising an endless flexible member adapted to be mounted partly on the tread of a wheel and partly at the sides of a wheel, said member consisting of alternate high and low portions, and non-rotating cam means adapted to engage a portion of the member as the wheel is rotated and shift the member to bring either the high or the low portions into position on the tread of the wheel.

4. An anti-skid device adapted to be mounted on a wheel, said device comprising an endless flexible member having alternate high and low portions, and a guide therefor adapted to be mounted on the periphery of a wheel so that portions of the member cross the tread of the wheel and portions lie at the sides thereof, and means for shifting the member in the guide to bring either the high or the low portions into position across the tread of the wheel.

5. In combination with a wheel having a groove in its tread surface, an anti-skid member mounted in the groove and having a high portion adapted to project beyond the tread surface and a low portion adapted to be completely housed within the groove, and means for shifting the member to bring either the high or low portion into position at the tread surface.

6. In combination with a wheel having grooves in its tread surface, a plurality of anti-skid members mounted in the grooves, each member having high and low portions, the high portion being adapted to project beyond the tread surface, and a non-rotating means for successively shifting the members as the wheel rotates to bring either the high or low portions into position at the tread surface.

7. In combination with a traction member adapted to be engaged about the periphery of a wheel, said traction member being provided with a plurality of transverse grooves extending across its traction surface, a flexible anti-skid member looped so that portions thereof are guided in said grooves, said anti-skid member being formed with successive alternately high and low portions, each portion being of substantially the length of one of the grooves, and means for shifting the anti-skid member longitudinally of itself to bring either its high or low portions into the grooves.

8. In combination with a traction member adapted to be engaged about the periphery of a wheel, said traction member being provided with a plurality of transverse grooves extending across its traction surface, a plurality of endless flexible anti-skid members, each member being looped through an adjacent pair of grooves and at the sides of the wheel, each member consisting of two relatively high sections and two relatively low sections, the sections being alternately arranged and means for shifting the members longitudinally to bring either the high or low sections into the grooves.

9. In combination with a traction member adapted to be engaged about the periphery of a wheel, said traction member being provided with a plurality of transverse grooves extending across its traction surface, a plurality of endless flexible anti-skid members each member being looped through an adjacent pair of grooves and at the sides of the wheel, each member consisting of two relatively high sections and two relatively low sections, the sections being alternately arranged, a projection extending from each of the looped members, and a pair of nonrotary cams independently movable toward or from the tread of the wheel to engage the projections and successively shift each anti-skid member longitudinally to bring either the high or low portions into the grooves.

10. In combination, a flexible traction covering adapted to be removably secured about the tread of a wheel or tire and normally rotate therewith, a series of anti-skid elements mounted in said traction covering and normally rotating with the covering and wheel and movable to or from operative positions in the covering, and means adapted to be mounted adjacent the wheel for moving the anti-skid elements into or out of operative position.

11. An anti-skid device adapted to be mounted on a wheel, comprising a flexible member having alternate high and low portions, and means for shifting the member to bring either the high or low portions into position on the tread of the wheel.

12. An anti-skid device adapted to be mounted on a wheel, comprising a flexible member having alternate high and low portions, means for movably guiding said member partly across the tread of the wheel and partly at the side of the wheel, and means for shifting the member in the guiding means to bring either the high or low portions into position on the tread of the wheel.

JAY A. ROBINSON.